United States Patent [19]

Okita et al.

[11] Patent Number: 4,641,211
[45] Date of Patent: Feb. 3, 1987

[54] DISK CARTRIDGE LOADING MECHANISM IN A RECORDING AND REPRODUCING APPARATUS

[75] Inventors: Masao Okita, Furukawa; Kunihiko Gunji, Miyagi; Yukio Saito, Furukawa, all of Japan

[73] Assignee: Alps Electric Co., Ltd., Japan

[21] Appl. No.: 633,141

[22] Filed: Jul. 23, 1984

[30] Foreign Application Priority Data

Jul. 21, 1983 [JP] Japan ............................. 58-112239[U]

[51] Int. Cl.$^4$ ........................ G11B 5/016; G11B 17/04
[52] U.S. Cl. ........................................... 360/97; 360/99
[58] Field of Search ..................................... 360/97–99

[56] References Cited

U.S. PATENT DOCUMENTS 4,368,495 1/1983 Hamanaka et al. .................... 360/97

Primary Examiner—Robert S. Tupper
Attorney, Agent, or Firm—Guy W. Shoup

[57] ABSTRACT

A recording and reproducing apparatus has a loading mechanism for loading a disk cartridge, which is inserted in a cartridge holder, between an eject position and an operative load position. The loading mechanism has a load lever which pivots the holder to the load position when the disk cartridge is inserted to push against a portion of a cam plate and move it rearwardly in the apparatus. The apparatus has only one tension spring between the load lever, which is angularly movable between an eject position and a load position, and the cam plate which can bear on the cartridge. The tension spring angularly biases the load lever toward the load position and biases the cam plate toward an opening through which the cartridge is inserted.

2 Claims, 7 Drawing Figures

DISK CARTRIDGE LOADING MECHANISM IN A RECORDING AND REPRODUCING APPARATUS

FIELD OF THE INVENTION

The present invention relates to an information recording and reading apparatus for use with a disk cartridge such as a magnetic disk cartridge.

SUMMARY OF THE INVENTION

It is the object of the present invention to provide an information recording and reading apparatus which is used with a disk cartridge and which is simple in structure but is capable of receiving and taking out the cartridge with certainty.

DETAILED DESCRIPTION OF THE INVENTION

Figure 1:
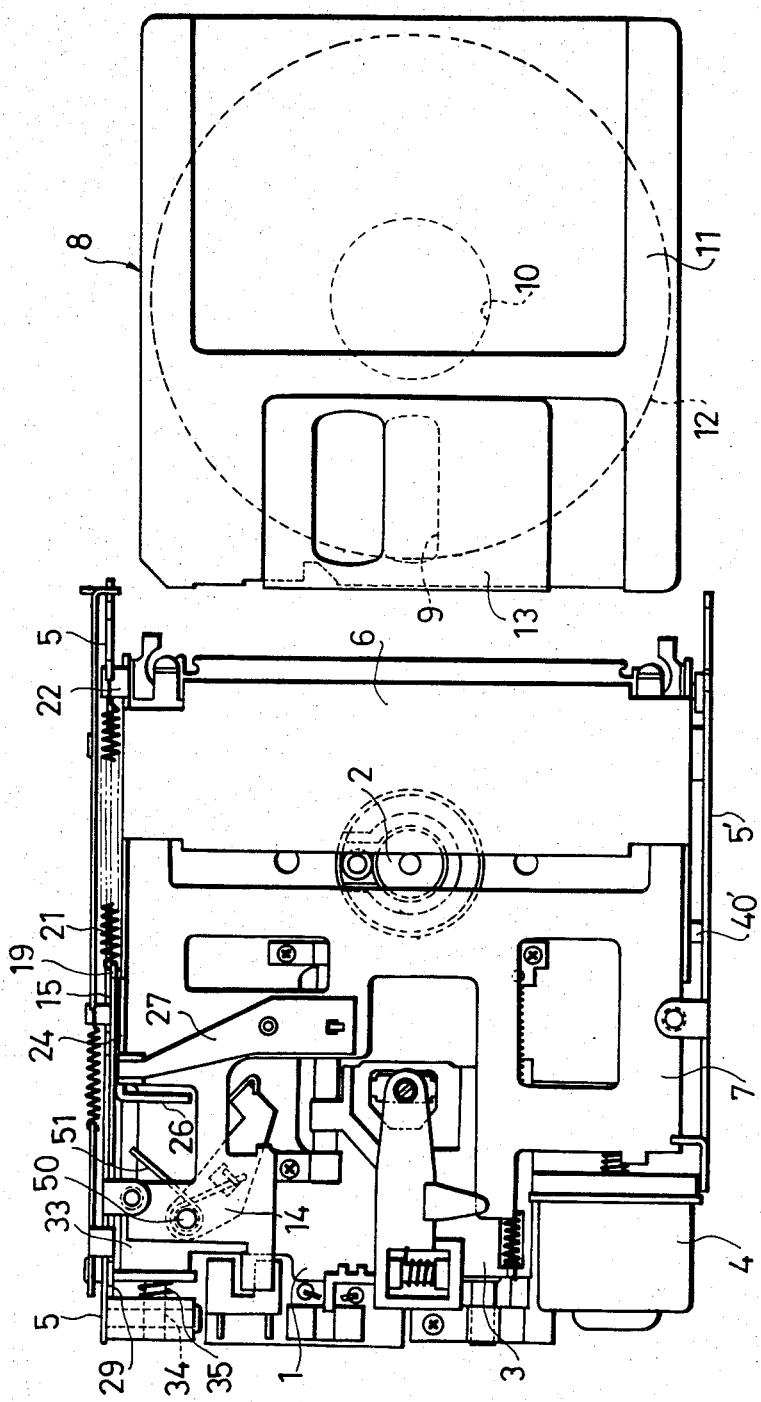
FIG. 1 is a plan view of an information recording and reading apparatus according to the present invention and a magnetic disk cartridge, for showing the condition before the cartridge is installed into the apparatus.

The structure of an information recording and reading apparatus embodying the concept of the present invention is first schematically described with reference to FIG. 1. The apparatus includes a frame 1, a shaft 2 for rotating a disk, a carriage 3 carrying magnetic heads and pads, and a stepper motor 4 for moving the carriage 3. The shaft 2, the carriage 3, and the motor 4 are disposed in their predetermined positions on the frame 1.

Two side plates 5 and 5' are screwed to opposite sides of the frame 1. A cartridge holder 7 is disposed on the inner side of the side plates 5 and 5' via a loading lever 6, and faces the upper portion of the shaft 2. The right end of the holder 7 as viewed in FIG. 1 is provided with an opening (not shown) to allow a magnetic disk cartridge 8 to be inserted toward the carriage 3 therethrough. The cartridge 8 consists of a casing 11 molded from a rigid synthetic resin, a magnetic disk 12 rotatably housed in the casing 11, a shutter 13, and other parts. The casing 11 is provided with an opening 9 at a certain position through which a magnetic head is inserted, and the opening 9 is covered by the shutter 13. The casing 11 is also formed with a hole 10 that receives the rotating shaft. An eject lever 14 acting to open the shutter 13 and to store the energy for driving out the disk cartridge is disposed in the holder 7 and between one side plate 5 and the carriage 3.

Figure 2:
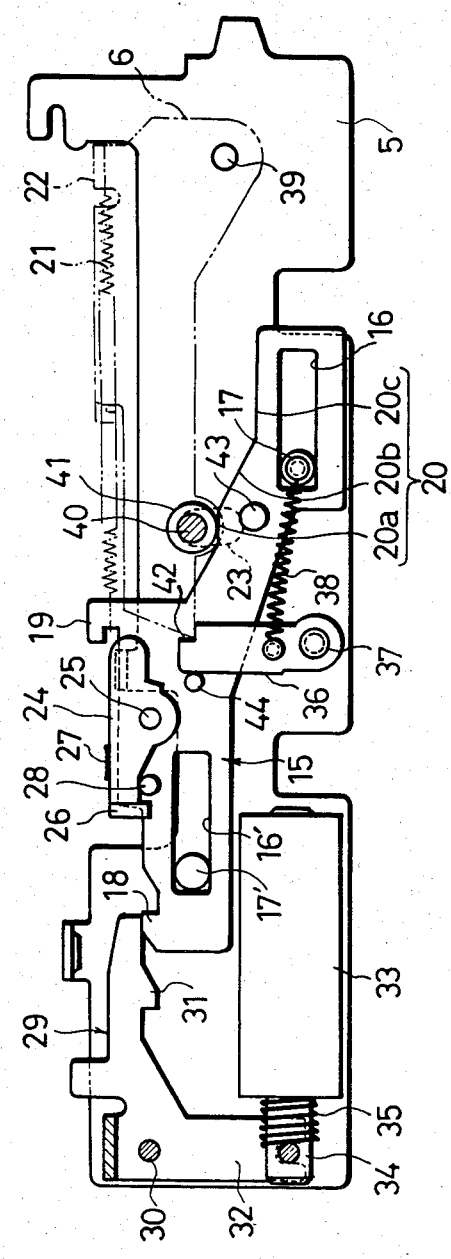
FIGS. 2 and 3 are side elevations for showing the operation of the cam plate of the apparatus shown in FIG. 1.
Figure 3:
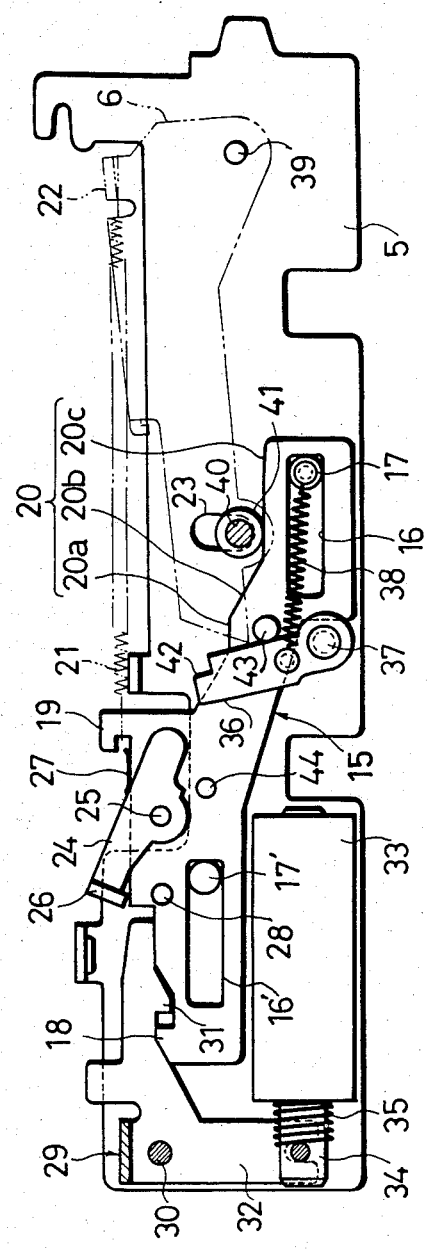

The structure of the apparatus is next described in greater detail by referring to FIGS. 2 and 3. A cam plate 15 is mounted to the inner surface of one side plate 5 such that it can slide along it. The plate 15 is provided with two slots 16 and 16' in which pins 17 and 17' extending vertically from the side plate 5 are respectively received to support the plate 15 in such a way that it can slide. The front end of the cam plate 15 is provided with a retaining claw 18. Provided in an intermediate position on the cam plate 15 is a protrusion 19 to which one end of a tension spring 21 is secured, the other end being secured to a spring-retaining portion 22 formed on the lever 6. The spring 21 acts to resiliently urge the cam plate 15 toward the opening for insertion of cartridge at all times. Further, the spring 21 serves to resiliently bias the loading lever 6 toward a load position as described later. Also provided in an intermediate position on the cam plate 15 is a cam portion 20 which is composed of an upper flat portion 20a, an inclined portion 20b, and a lower flat portion 20c. A longitudinally extending window 23 is formed in the slide plate 5 in opposed relation to the cam plate 15. A similar window (not shown) is formed in the other side plate 5' and opposed to the cam portion.

A rotary lever 24 is supported near the center of the upper end of the cam plate 15 so as to be rotatable about a shaft 25. The front end of the lever 24 is bent into a hooked form to form an abutment 26 with which the magnetic disk cartridge 8 comes into abutting engagement. A retaining plate 27 made of a leaf spring has its one end securely fixed to the upper surface of the cartridge holder 7, the other end being in resilient contact with the lever 24. A portion of the cam plate 15 protrudes to form a stop 28 on which the lever 24 bears, whereby further downward movement of the lever from the horizontal is prevented.

A lock lever 29 is supported to the inner surface of the side plate 5 so as to be rotatable about a support pin 30, corresponding to the cam plate 15. One end of the lever 29 is provided with an engagement portion 31 which can engage with the retaining claw 18 on the front end of the cam plate 15. A portion 32 depends from the other end of the lever 29, and has its front end connected to the armature 34 of an electromagnetic solenoid 33. A coiled spring 35 is fitted over the armature 34, and serves to always and resiliently bias the lock lever 29 angularly about the pin 30 such that the engagement portion 31 engages with the retaining claw 18.

A lock member 36 is held near the center of the inner surface of the side plate 5 in such a way that it can rotate about a pivot 37. A coiled spring 38 which extends between the lock member 36 and the pin 17 acts to resiliently and angularly bias the member 36 toward the opening for insertion of cartridge, namely clockwise as viewed in FIGS. 2 and 3, at all times.

Figure 4:
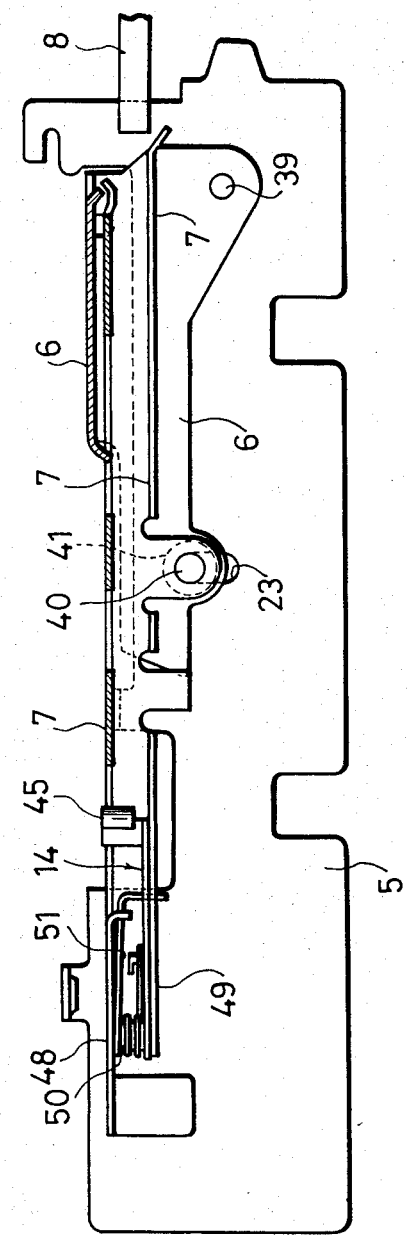
FIGS. 4 and 5 are side elevations in cross section for showing the operation of the cartridge holder of the apparatus shown in FIG. 1.
Figure 5:
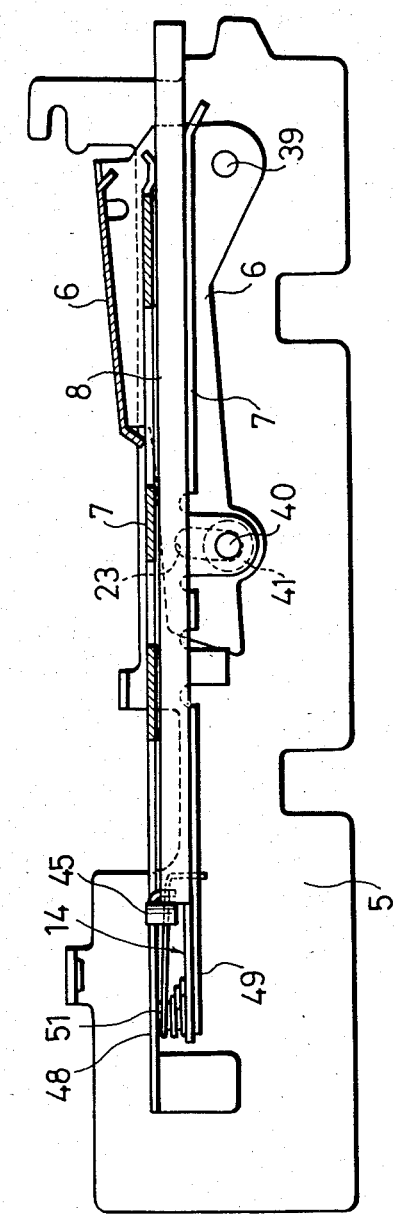

The aforementioned loading lever 6 is held to the side plates 5 and 5' so that it may turn about support pins 39 and 39'. Also, the lever 6 is always resiliently biased downward about the pins 39 and 39' toward the load position, i.e., counterclockwise as viewed in FIGS. 2 and 3, by the tension spring 21. The lever 6 and the cartridge holder 7 disposed on the inner side of the lever 6 are rotatably connected together by means of connecting pins 40 and 40' as shown in FIGS. 4 and 5. The front ends of the pins 40 and 40' are inserted in the above-described windows 23 formed in the side plates 5 and 5', respectively. A roller 41 which comes into contact with the cam portion 20 of the cam plate 15 is loosely inserted in one pin 40. The front end of the lever 6 can come into engagement with a step 42 formed on the upper end of the locking member 36. When the lever 6 is locked on the step 42 of the member 36, further rotation of the lever 6 is prevented against the action of the tension spring 21. This maintains the cartridge holder 7 in the eject position. An unlocking pin 43 which vertically extends from the cam plate 15 acts to disengage the load lever 6 from the step 42 by bearing on the locking member 36. A protrusion 44 is formed integrally with the cam plate 15 to restore the lever 6 to its engagement with the step 42.

Figure 6:
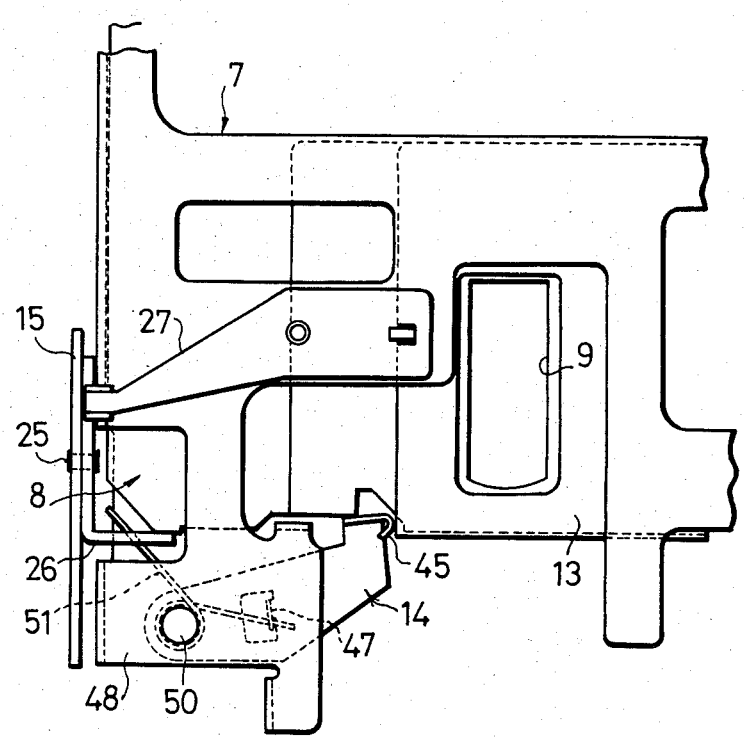
FIG. 6 is a plan view for showing the operation of the eject lever of the apparatus shown in FIG. 1.
Figure 7:
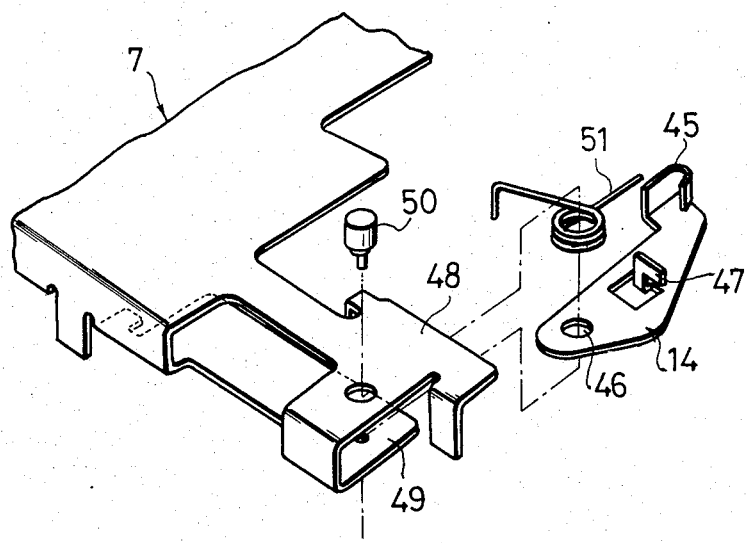
FIG. 7 is an exploded perspective view of the vicinity of the eject lever shown in FIG. 6.

Referring next to FIGS. 6 and 7, the aforementioned eject lever 14 made of a metal sheet has a bent abutment 45 at its front end. The rear end of the lever is provided with a hole 46 extending through the lever. A raised portion 47 is formed in the center of the lever 14 such that a spring (described later) is anchored to the portion 47. The lever 14 is mounted between the upper surface 48 of the cartridge holder 7 and the lower surface 49 that is formed by bending the front end of the holder 7 downward. A pivot 50 is crimped against the holder 7, and is loosely inserted in the hole 46, so that the lever 14 is rotatably held to the holder 7. A helical torsion spring 51 that is wound on the pivot 50 has its one end secured to the portion 47 of the lever 14, the other end being secured to the lower surface 49 of the holder 7. Thus, the eject lever 14 is always resiliently urged toward the opening for insertion of cartridge.

The manner in which the magnetic disk cartridge 8 is installed into the information recording and reading apparatus is now described. FIGS. 1, 2, and 4 show the condition prior to insertion of the cartridge 8 as mentioned above. Under this condition, the cam plate 15 is pulled toward the opening for insertion of cartridge by the action of the tension spring 21, as shown in FIG. 2, and the upper flat portion 20a of the plate 15 is opposed to the window 23 in the side plate 5. Hence, the roller 41 rides on the flat portion 20a, thereby preventing the lever 6 from rotating downward. The cartridge holder 7 is kept in the standby position, or eject position, as shown in FIG. 4. Since the electromagnetic solenoid 33 is not excited, the locking lever 29 is made contact with the cam plate 15 and at rest by the resilient force of the coiled spring 35. The cam plate 15 is pulled toward the opening for insertion of cartridge as noted above, and therefore its retaining claw 18 is not in engagement with the engagement portion 31 of the locking lever 29. Further, the front end of the load lever 6 bears on the step 42 of the locking member 36 and so downward movement of the lever 6 is prevented. As shown in FIG. 1, the front end of the lever 14 faces the opening for insertion of disk. The front end of the leaf spring 27 lies between the shaft 25 and the abutment 26, as shown in FIGS. 1 and 2, such that it urges the rotary lever 24 into abutting engagement with the stop 28.

Under these conditions, when the magnetic disk cartridge 8 is inserted into the cartidge holder 7, the front end of the eject lever 14 first strikes on the fringe of the shutter 13. Then, the cartridge 8 is inserted further to rotate the lever 14 in a clockwise direction as viewed in FIG. 1, storing resilient energy in the helical torsion spring 51. As the lever 14 is rotated, the shutter 13 is opened thus to expose the opening 9 for insertion of magnetic head as shown in FIG. 6.

During the process of the insertion of the cartridge 8, its front end bears on the abutment 26 of the lever 24, and the cam plate 15 is moved toward the lock lever 29 against the resilience of the spring 21 by the force to insert it while increasing the tension of the spring 21. Then, the retaining claw 18 of the plate 15 pushes up the engagement portion 31 of the lock lever 29 and comes into engagement with the portion 31. In this way, the cam plate 15 is locked and prevented from returning its original position. As the plate 15 is moved, the inclined portion 20b becomes opposed to the window 23 in the side plate 5. When the plate arrives at the position where it is locked, the inclined portion 20b is in opposition to the window 23 near its lower end. At this time, the front end of the loading lever 6 is yet carried by the step 42 of the locking member 36, preventing the lever 6 from rotating downward. Accordingly, the cartridge holder 7 which is connected to the lever 6 via the pins 40 and 40' is retained in the first eject position shown in FIG. 4. Thus, the roller 41 is located at the upper portion of the window 23 and is at a distance from the inclined portion 20b.

When the magnetic disk cartridge 8 is inserted further after the cam plate 15 has been locked as observed above, the unlocking pin 43 bears on the locking member 36 to rotate it, as shown in FIG. 3. This disengages the front end of the loading lever 6 from the step 42. Then, the tension spring 21 in which a sufficient resilient energy is stored turns the lever 6 downward, i.e., toward the load position, about the support pin 39, lowering the connecting pins 40, 40' and the roller 41 within the windows 23. This causes the cartridge holder 7 to move down toward the shaft 2 that rotates the disk, as shown in FIG. 5, whereby the cartridge 8 is held in position, thus completing the preparations for recording or reading operation.

At this time, since the eject lever 14 is supported to the holder 7, the disk cartridge 8 and the lever 14 are lowered together with the holder 7 without producing frictional force between the cartridge 8 and the lever 14. Consequently, the cartridge 8 can be smoothly moved to the load position. The rotary lever 24 rotates about the shaft 25 in a clockwise direction as viewed in FIG. 2, because the leaf spring 27 is in resilient contact with the rotary lever 24 near the opening for insertion of cartridge not with the shaft 25 under the loaded condition, and because the holder 7 moves downward. The result is that the lever 24 moves away from the front end of the cartridge 8, as shown in FIG. 3, thus completing the installation of the cartridge 8. In this condition, the roller 41 is located on the lower flat portion 20c, as shown in FIG. 3.

The magnetic disk cartridge 8 is ejected in the manner described hereinafter. First, the solenoid 33 is excited based on a signal indicative of ejection that is supplied from a control section (not shown). Then, the armature 34 is pulled against the resilience of the coiled spring 35 to rotate the lock lever 29 counterclockwise as viewed in FIG. 3, disengaging the retaining claw 18 from the engagement portion 31. The restoring force of the tension spring 21 then restores the cam plate 15 to the vicinity of the opening for insertion of cartridge. As the cam plate 15 is moved, the roller 41 is moved up along the inclined portion 20b until it rides on the upper flat portion 20a as shown in FIG. 2, whereupon the load lever 6 is rotated upward against the resilience of the tension spring 21. Then, the lever 6 again comes into engagement with the step 42 of the locking member 36 which is angularly moved back to its original position by the coiled spring 38 and the protrusion 44, so that the cartridge holder 7 receiving the disk cartridge 8 is pushed from the load position to the eject position. As the eject lever 14 held to the holder 7 is moved together with the holder, the cartridge 8 can again be moved smoothly to the eject position without producing frictional force between the cartridge 8 and the eject lever 14. Then, the restoring rotating force of the lever 14 in which resilient energy is stored and the movement of the rotary lever 24 toward the opening for insertion of cartridge that is made as a consequence of the backward movement of the cam plate 15 move the cartridge 8 out of the holder 7. Subsequently, a spring means (not shown) moves the shutter 13 toward the closure position shown in FIG. 1 to close the opening 9 for insertion of magnetic head. The leaf spring 27 is again brought to a position lying between the shaft 25 and the abutment 26. Thus, the lever 24 is resiliently urged toward a direction to bear on the step 28, thus making preparations for accepting the cartridge 8.

As thus far described, the novel information recording and reading apparatus for the disk cartridge comprises the loading lever angularly movable about the pivot between the eject position and the loading position, the locking means for holding the loading lever in the eject position, and the cam plate that bears on the disk cartridge and can move back and forth, the loading lever being moved from the eject position to the load position by moving the cam plate forward and releasing the locking means, the loading lever being moved from the load position to the eject position by moving the cam plate backward. The apparatus is characterized by the provision of the tension spring between the loading lever and the cam plate to angularly bias the loading lever toward the load position and to bias the cam plate toward the opening through which the cartridge is inserted.

Consequently, it is not necessary to provide two separate springs one of which acts to angularly urge the loading lever toward the load position and the other of which acts to pull the cam plate toward the opening for insertion of cartridge. Rather, only one tension spring is needed which is mounted between the load lever and the cam plate, and which combines the rotating operation of the load lever with the restoring operation of the cam plate. Therefore, the apparatus is simple in structure and easy to assemble. Further, the disk cartridge can be certainly received and taken out, because when the disk cartridge is inserted and the cam plate is advanced, the tension spring is stretched and exerts a larger force to the load lever toward the load position.

While the preferred embodiment has been described in considerable detail, the present invention is not to be limited to such detail except as may be necessitated by the appended claims.

What is claimed is:

1. In a recording and reproducing apparatus for a disk cartridge comprising:
   (a) means including a cartridge holder adapted to hold a disk cartridge for movement between a first position for moving said cartridge into and out of said apparatus and a second position in which a disk cartridge fully inserted in said cartridge holder is moved to engage a magnetic head in said apparatus, said cartridge holder having an insertion end disposed toward a forward end of said apparatus and a distal end disposed toward a rearward end of said apparatus;
   (b) means including a load lever mounting said cartridge holder for moving said cartridge holder between said first and second positions;
   (c) locking means engageable with said load lever for holding said cartridge holder in said first position prior to full insertion of said disk cartridge in said cartridge holder;
   (d) means including a cam plate movable rearwardly by abutting engagement with a disk cartridge inserted in said cartridge holder of said apparatus;
   (e) said cam plate having a member for moving said locking means to release said load lever when said cam plate is moved to its rearward position, thereby allowing said cartridge holder to move to said second position, and means for moving said cartridge holder from said second position back to said first position upon movement of said cam plate forwardly for ejection of said cartridge;
   (f) wherein the improvement comprises a tension spring mounted between the load lever and the cam plate to bias the load lever toward the second position and at the same time to bias the cam plate forwardly.

2. In an information recording and reading apparatus for a disk cartridge as set forth in claim 1, the further improvement wherein the cam plate is so disposed that when the disk cartridge is inserted into the apparatus, the cam plate is moved rearwardly, thereby stretching the tension spring further.

* * * * *